Patented Aug. 22, 1933

1,923,216

UNITED STATES PATENT OFFICE 1,923,216

METAL COMPOUND OF O-HYDROXYAZO DYESTUFFS

Hans Krzikalla, Mannheim, and Franz Bluemmel, Seckenheim, Germany, assignors to General Aniline Works, Inc., New York, N. Y., a Corporation of Delaware No Drawing. Application November 20, 1928, Serial No. 320,747, and in Germany November 29, 1927

6 Claims. (Cl. 260—12)

Our present invention relates to new complex metal compounds of o-hydroxyazo dyestuffs, more particularly it relates to complex metal compounds obtainable by treating the o-hydroxyazo dyestuffs, prepared from a diazo compound of o-aminophenol or a substitution product thereof containing, for instance, one or more chlorine atoms, or one or more nitro groups, or both of these substituents and m-phenylenediamine or its nitro, halogen or alkyl substitution products, with compounds of metals capable of forming complex metal compounds with the said dyestuffs. The treatment may be carried out for instance by boiling or heating the said dyestuffs with the metal compounds at ordinary or elevated pressure. Especially the resulting complex chromium or copper compounds are suitable for dyeing leather and the resulting dyeings are very fast to light.

The following examples will further illustrate how the said invention may be carried out into practical effect but the invention is not limited to these examples. The parts are by weight.

Example 1

38.5 parts of the o-hydroxyazo dyestuff obtainable from diazotized 4-nitro-2-aminophenol-6-sulphonic acid and p-chlor-m-phenylenediamine are heated at 105° centigrade for 2 hours in an autoclave with a solution containing 9.1 parts of chromium oxid ($Cr_2O_3$) and 14 parts of 85 per cent formic acid in 600 parts of water. The dyestuff obtained on salting out gives brown dyeings on leather which are very fast to light.

The copper compound of the same o-hydroxyazo dyestuff, which can be easily obtained by boiling the latter with copper acetate or copper sulphate, gives similar dyeings on leather. Slightly more reddish brown shades on leather are obtained with the similarly prepared chromium compound of the dyestuff containing p-nitro-m-phenylenediamine instead of p-chlor-m-phenylenediamine.

Example 2

About 36 parts of the azo dyestuff obtainable from diazotized 4-nitro-2-aminophenol-6-sulphonic acid and m-toluylenediamine are boiled for about 20 hours under a reflux cooler with about 600 parts of water, 23 parts of copper formate and about 4 parts of 85 percent formic acid, the dyestuff being filtered by suction and dried. It gives fast yellow brown dyeings on leather. The chromium compound of the same o-hydroxyazo dyestuff gives shades having a more reddish tinge.

What we claim is:

1. As products, the complex compounds of a metal selected from the group consisting of copper and chromium with o-hydroxyazo dyestuffs of the general formula

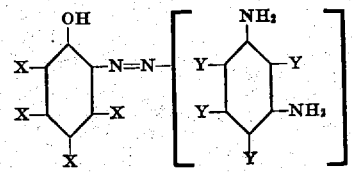

wherein one X stands for chlorine or the nitro group, one X for hydrogen or the sulfonic acid group and the other X's represent hydrogen or chlorine or the nitro group, and wherein one Y in ortho-position to one of the amino groups represents the linkage to the azo group, one Y stands for hydrogen or for a substituent of the group consisting of halogen, the alkyl radicle and the nitro group, and the other Y's represent hydrogen.

2. As products, the complex compounds of a metal selected from the group consisting of copper and chromium with o-hydroxyazo dyestuffs of the general formula

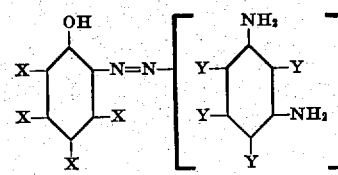

wherein one X stands for chlorine or the nitro group, one X stands for the sulfonic acid group and the other X's represent hydrogen, chlorine or the nitro group and wherein one Y in ortho-position to one of the amino groups represents the linkage to the azo group, one Y stands for hydrogen or for a substituent of the group consisting of halogen, the alkyl radicle and the nitro group, and the other Y's represent hydrogen.

3. As products, the complex compounds of a metal selected from the group consisting of copper and chromium with o-hydroxyazo dyestuffs of the general formula

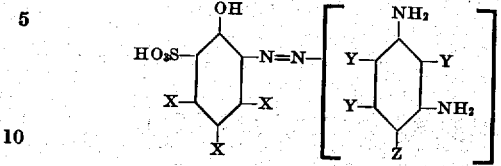

wherein one X stands for chlorine or the nitro group and the other X's represent hydrogen or chlorine or the nitro group and wherein one Y in ortho position to one of the amino groups represents the linkage to the azo group, one Y stands for hydrogen or the methyl group and the other Y stands for hydrogen and Z represents hydrogen, chlorine or the nitro group.

4. As products, the complex compounds of a metal selected from the group consisting of copper and chromium with o-hydroxyazo dyestuffs of the general formula

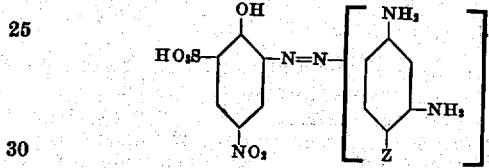

wherein Z stands for chlorine or the nitro group and wherein the azo group is connected to an ortho position to one of the amino groups in the phenylene diamine nucleus, the said compounds giving brown shades on leather.

5. As products, the complex compounds of a metal selected from the group consisting of copper and chromium with the o-hydroxyazo dyestuff corresponding to the general formula:

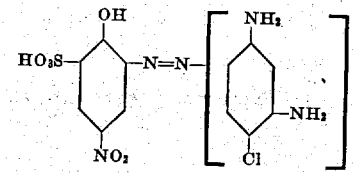

in which the azo group is connected to an ortho position to one of the amino groups in the phenylene diamine nucleus, the said compounds giving brown shades on leather.

6. As a product, the complex chromium compound of the o-hydroxyazo dyestuff corresponding to the formula:

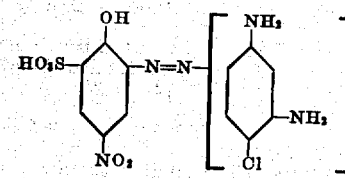

in which the azo group is connected to an ortho position to one of the amino groups in the phenylene diamine nucleus, the said compounds giving brown shades on leather.

HANS KRZIKALLA.
FRANZ BLUEMMEL.